United States Patent
Wong et al.

(10) Patent No.: US 6,578,037 B1
(45) Date of Patent: Jun. 10, 2003

(54) PARTITIONED ACCESS CONTROL TO A DATABASE

(75) Inventors: Daniel Manhung Wong, Sacramento, CA (US); Chon Hei Lei, Alameda, CA (US)

(73) Assignee: Oracle Corporation, Redwood Shores, CA (US)

( * ) Notice: Subject to any disclaimer, the term of this patent is extended or adjusted under 35 U.S.C. 154(b) by 164 days.

(21) Appl. No.: 09/589,602

(22) Filed: Jun. 7, 2000

Related U.S. Application Data

(63) Continuation-in-part of application No. 09/167,092, filed on Oct. 5, 1998, now Pat. No. 6,487,552.

(51) Int. Cl.$^7$ .............................................. G06F 17/30
(52) U.S. Cl. ............................................. 707/10; 707/9
(58) Field of Search ................................. 709/202, 203; 707/1, 5, 9, 10, 100; 340/5.54; 235/382

(56) References Cited

U.S. PATENT DOCUMENTS

| | | | | |
|---|---|---|---|---|
| 5,265,221 A | * | 11/1993 | Miller | 235/382 |
| 5,276,901 A | * | 1/1994 | Howell et al. | 340/5.54 |
| 5,428,778 A | * | 6/1995 | Brookes | 707/5 |
| 5,751,949 A | * | 5/1998 | Thomson et al. | 713/201 |
| 5,765,154 A | | 6/1998 | Horikiri et al. | 707/10 |
| 5,787,428 A | * | 7/1998 | Hart | 707/9 |
| 5,815,574 A | | 9/1998 | Fortinsky | 380/25 |
| 5,940,818 A | * | 8/1999 | Malloy et al. | 707/100 |
| 6,026,388 A | | 2/2000 | Liddy et al. | 707/1 |
| 6,134,549 A | * | 10/2000 | Regnier et al. | 707/10 |
| 6,275,824 B1 | * | 8/2001 | O'Flaherty et al. | 707/1 |
| 6,363,387 B1 | * | 3/2002 | Ponnekanti et al. | 707/1 |

* cited by examiner

*Primary Examiner*—Diane D. Mizrahi
*Assistant Examiner*—Yicun Wu
(74) *Attorney, Agent, or Firm*—Marcel K. Bingham; Hickman Palermo Truong & Becker LLP

(57) ABSTRACT

Described is a technique for controlling access to data in a database system. Groups of security policies are established for a database schema object, such as a table or a view. A security policy reflects access rules for accessing the database schema object. Access to the database schema object is restricted based on security policy groups selected for the user. The security policy groups are selected based on information associated with a user that is maintained or accessed by the database system. A default security policy is established and used to restrict access of users accessing the database schema object. The information associated with the user contains an attribute that identifies a policy group. The database management system uses the attribute to select policy groups that restrict the user's access to the database scheme object. When the attribute does not identify any security policy group established for the database schema object, all security policies established for the database schema object are used to restrict access to the database schema object.

22 Claims, 3 Drawing Sheets

PARTITIONED ACCESS CONTROL TO A DATABASE

RELATED APPLICATION

This application is a continuation-in-part of U.S. application Ser. No. 09/167,092, filed Oct. 5, 1998, now U.S. Pat. No. 6,487,552 entitled "Database Fine-Grained Access Control", herein referred to as Lei, and naming as inventors Chon Hei Lei and Douglas James Mcmahon, the entire disclosure of which is hereby incorporated by reference.

FIELD OF THE INVENTION

The present invention relates to database management systems, and in particular, to controlling access to data managed by a database system.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it may not be desirable for all users to have access to all of the rows of a particular table. For example, some rows in a table may contain text in English, while other rows contain text in Spanish. In this case, it would be convenient to limit the access of English-speaking users to the rows containing English, and the access of Spanish-speaking users to the rows containing Spanish.

It may also be desirable to restrict access to certain rows for security reasons. For example, certain rows of a table may contain top secret information, other rows may contain secret information, while other rows contain unclassified information. Under these conditions, the rows made available to any given user should be dictated by the security clearance of that user.

Both of the situations described above require row-level filtering of data, and the second situation also requires that the filtering enforce an access-control policy. To enforce row-level access-control policies, a database server must have a mechanism for restricting users to particular subsets of the rows within tables. One technique for implementing row-level access-control policies involves causing all access to a table to be performed indirectly through "views".

A view is a logical table. As logical tables, views may be queried by users as if they were a table. However, views actually present data that is extracted or derived from existing tables. A view is defined by metadata referred to as a view definition. The view definition contains mappings to one or more columns in the one or more tables containing the data. Typically, the view definition is in the form of a database query. Columns and tables that are mapped to a view are referred to herein as base columns and base tables of the view, respectively.

To restrict a user to a particular subset of rows within a table, the user may be granted rights to access a view that extracts from the table only those rows that belong to that particular subset. For example, assume that a table "t" has two columns "text" and "lang". The "text" column of each row stores textual information, and the "lang" column of each row stores data indicating the language of the text of that row. Under these conditions, English speaking users may be restricted to accessing table "t" through a view defined as follows:

V1:

SELECT * from t

WHERE t.lang='English' while Spanish speaking users may be restricted to accessing table "t" through a view defines as follows:

V2:

SELECT * from t

WHERE t.lang.='Spanish'

Each of these view definitions contain a WHERE clause that specifies conditions that restrict the rows of table t that are retrieved by the views. These conditions are referred to as the "predicates" of the view definitions.

Views offer a convenient way to provide row-level access control when the users fall into a relatively small number of categories. For example, if users are categorized solely on the basis of language and only two languages are supported, then only two views need to be created. However, many access policies require users to be divided into a large number of categories based on multiple criteria.

For example, an access policy may require access to be determined based on a user's language, security clearance, and department. If the database system supports 20 languages, 5 security clearance levels, and 15 departments, the number of views required to implement the access policy would be 20*5*15=1500. For example, the view that would be used by English speaking users with security clearance of 3 that belong to the Insurance department may be defined as follows:

V3:

SELECT * from t

WHERE t.lang='English'

AND t.security_level<=3

AND t.dept='Insurance'

View V3 uses "hard-coded" literals, such as 'English', 3, and 'Insurance'. The use of hard-coded literals in view definitions can have serious performance implications. Specifically, the use of literals renders similar queries (that would otherwise be able to share query plans and resources) into distinct queries that can share no resources.

In some cases, access policies may dictate that every individual is to be treated differently. For example, an access policy may dictate that every user is only able to access rows that contain his or her user_id. Under these circumstances, a separate view would have to be created for every user. The view for a particular user would, for example, be defined as follows:

V4:

SELECT * from t

WHERE t.user_id=5837392

Under certain conditions, the proliferation of views may be avoided through the use of bind variables. This requires that the database application issue SQL containing bind variables, such as in the following example:

V5:
SELECT * from t
WHERE t.user_id=:BINDVAR

In the query V5, BINDVAR is a bind variable that may be set to a value by the user prior to submitting the query V5. For example, the user that has the user_id of 5837392 can set BINDVAR to 5837392 prior to accessing data using query V5. In this case, query V5 would extract from table t the same rows as the query that defines view V4, in which the user_id value is hard-coded.

Note that the bind variable solution depends entirely on ubiquitous coding in the database application itself. This is not only potentially weaker from a security standpoint, but it is tedious and difficult to code for the application programmers.

Because each user can tailor query V5 by setting BINDVAR to his or her own user_id, only one query is required to implement a policy that would otherwise have required one view per user.

Unfortunately, if the user with the user_id of 5837392 can set BINDVAR to 5837392, then it may be possible for other users to do so as well. When bind variables are used in queries that implement an access policy, the entity that has power to set the bind variables typically also has the power to violate the policy. In many instances, the entity that sets the bind variables is a database application. If the database application is not secure, or if it is possible for users to circumvent the database application, then the data protected by the access policy is not secure.

Another approach to avoid the use of multiple views to implement an access control policy involves the use of a "session" table. When a session is started, a row is added to the session table for the newly started session. The row indicates the session_id of the new session, as well as any other values that are factors used in the access control policy. For example, the session table entry may include the user_id, language, and department of the user that has established the session. All users are then required to access the protected table through a view that performs a join between the session table and the protected table. Such a view may be defined as follows:

V6:
SELECT * from t, session
WHERE t.lang=session.lang
AND t.dept=session.dept
AND session.session_id=CURRENT_SESSION_ID where CURRENT_SESSION_ID is a value from a session pseudo-column that is set to the session id of the session in which the view is being accessed.

The session table approach has some significant drawbacks. For example, the extra join with the session table can severely affect the efficiency of query execution. In addition, the maintenance of the session table is difficult. For example, simply cleaning up the table to remove sessions that are no longer active can be problematic, especially if a client session were to terminate abnormally and thus not execute any required closing logic.

In addition to the problem of view proliferation, another problem associated with using views to implement an access policy is that not all policy rules can be easily evaluated by the database server. For example, if the access control policy is "a user accessing the EMP table as a Payroll clerk through the Payroll application is allowed to see all EMP information, including SALARY, but only for employees in her division," then views will probably not be able to implement the policy, since the database server will not be able to determine what application a user is using.

Another problem associated with using views to implement an access control policy is that, frequently, users need at least query access to base tables. Users who have privileges on base tables are able to bypass the security enforcement provided by views.

Another problem associated with using views to implement an access control policy is that it can make the access control policy extremely difficult to administer. For example, when a security rule is added, changed, or removed, it may be very difficult to figure out what exactly must be done with each view. An administrator cannot tell whether changing security policies (for example, by altering or dropping a view) will break a database application.

Based on the foregoing, it is clearly desirable to provide a mechanism for implementing access control policies within a database, where the mechanism (1) does not severely impact the efficiency of query execution, (2) does not rely on users to access data through a particular view or set variables to the appropriate values, (3) supports relatively complex access control rules, and (4) does not make access control management impracticably complex.

SUMMARY OF THE INVENTION

Provided is a technique for controlling access to data in a database system. According to an aspect of the present invention, groups of security policies are established for a database schema object, such as a table or a view. A security policy reflects access rules for accessing the database schema object. Access to the database schema object is restricted based on security policy groups selected for the user. The security policy groups are selected based on information associated with a user that is maintained or accessed by the database system.

According to another aspect of the present invention, a default security policy is established and used to restrict access of users accessing the database schema object. The information associated with the user contains an attribute that identifies a policy group. The database management system uses the attribute to select policy groups that restrict the user's access to the database scheme object. When the attribute does not identify any valid security policy group established for the database schema object, all security policies established for the database schema object are used to restrict access to the database schema object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for partitioning access control in a system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Fine-Grained Access Control

Fine grained access control is an efficient access control mechanism that not only avoids relying on users accessing data through a particular view or setting variables to the appropriate values, but supports relatively complex access policies and management of them in a manner not impracticably complex. A fined-grain access control mechanism is described in Lei. In Lei the mechanism is based on one or more policy functions associated with a database object (e.g. table or view). The policy functions are invoked, when, for example, a database system detects that a query is issued against the database object.

One drawback of the fine-grain access control mechanism in Lei stems from its use of one set of policy functions for all users or applications who share the same database object but do not share the same access policies. To implement each access policy, developers of who develop policy functions on behalf of a user must ensure they embed logic in the policy functions that accounts for each user's respective access rules. This may require participation from each of the users. Implementing policy functions for a particular database object may thus be very difficult, because the implementation requires effort, cooperation, and agreement from each user that needs access to the database object but may represent the different interests of different companies. It is therefore clearly desirable to provide a mechanism that enables users to independently implement their own policy functions in a manner that reduces or eliminates the need to cooperate with other users.

Such a mechanism is described herein. The mechanism provides partitioned access control. Partitioned access control refers to ability to apply different sets of security policies for different sets of users. A policy is data, which may include executable code, that reflects rules that govern access to data, such as the data in database schema objects.

For example, a policy may be a routine or function that generates a predicate to append to a query, such as the system of dynamic predicate attachment described in Lei. The predicate specifies conditions that restrict results returned by a query, thereby restricting access to data. Using the techniques for access control described herein, a set of policies may be independently implemented for each user or application.

Exemplary Partitioned Access Control

Figure 1:
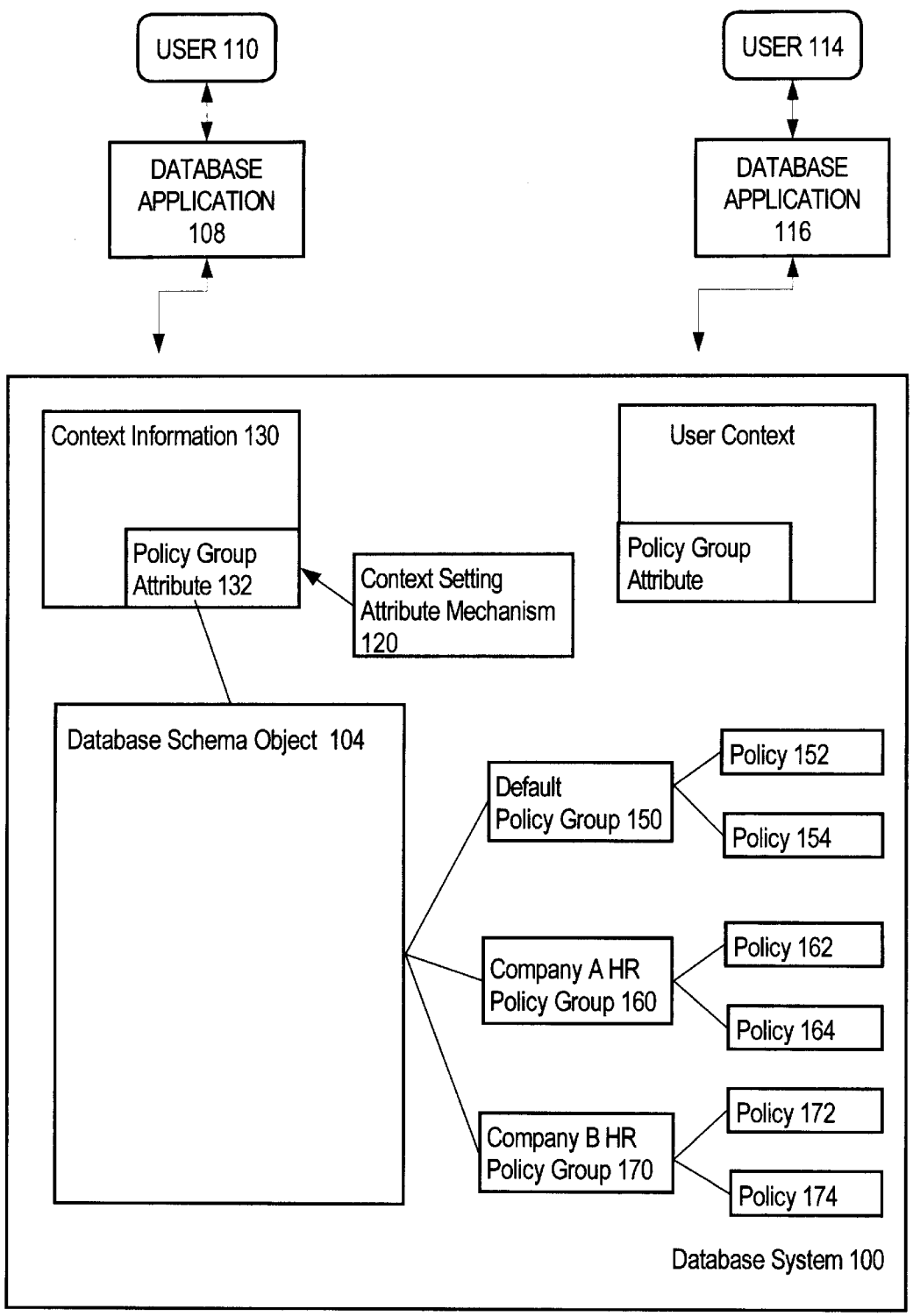
FIG. 1 is a block diagram depicting a database management system upon which an embodiment of the present invention may be implemented.

Referring to FIG. 1, it illustrates a DBMS 100 configured according to an embodiment of the invention. DBMS 100 manages access to database schema objects within DBMS 100, which include database schema object 104. For purposes of illustration, it shall be assumed that database schema object 104 is an employee table. A database schema object may be a table or view, or any object that may be accessed by a user through DBMS 100.

Database applications 108 and 116 interact with DBMS 100 in response to input from users 110 and 114, respectively. Such interactions involve issuing queries to DBMS 100, and receiving from DBMS 100 the results of the queries. Typically, queries request access to data in one or more database schema objects in DBMS 100.

Database schema object 104 is associated with policy groups, which include default policy group 150, Company A HR policy group 160, and Company B HR policy group 170. A policy group is a collection of policies. Default policy group 150 includes policies 152 and 154, Company A HR policy group 160 includes policies 162 and 164, Company B HR policy group 170 includes policies 172 and 174.

Database metadata on DBMS 100 defines policy groups, which policy groups are associated with database schema objects, and which policies belong to which policy groups. When DBMS 100 receives a query that requires access to database schema object 104, DBMS 100 inspects the database metadata and information about the user to determine whether any policy groups should be applied, in a manner to be described in greater detail hereafter. A policy group may contain policies that may be implemented and customized by or on behalf of particular users. DBMS 100 may be configured to use a particular policy group for a particular user or set of users, applying the policies that have been customized for a particular user.

Company A HR policy group 160 and Company B HR policy group 170 reflect the different policies of users 110 and 114, respectively. Specifically, policy functions 162 and 164 reflect access rules for users who are persons in the Human Resource department of Company A accessing database schema object 104. Those access rules may, for example, permit users in Human Resources of Company A to access employee records of employees earning salaries below a threshold. Policy functions 172 and 174 reflect access rules for users who are persons in the Human Resources department of Company B. Access rules to database schema object 104 for Company B are not based on the salary of employees. Rather, the access rules of Company B, for users in the Human Resources Department permit those users to access employee records of employees who belong to particular job categories.

For security purposes, it is useful to have a policy group that applies to all users. Default policy group 150 contains policies that reflect access rules for all users. For example, policies 152 and 154 may limit access by a user to records in database schema object 104 that are identified with a company associated with the user. Under these circumstances, the rules reflected in the default policy group are applied in addition to, rather than instead of, the rules of the more specific policy groups that apply to the user.

Designating Policy Groups to Apply to a User

To determine whether a particular policy group should limit a user's access to data, DBMS 100 needs information about the user that may be used to determine what policy groups to apply to the user. Context information 130 is information associated with a user that is maintained or accessed by DBMS 100. Context information 130 contains a policy group attribute 132. A policy group attribute, such as policy group attribute 132, is an attribute or data element in Context information that identifies which policy group should apply. Preferably, a policy group attribute is an attribute which may be securely set by DBMS 100 in response to messages from an application, and may therefore be trusted by the database system and relied upon to determine what policy groups to apply.

One mechanism for associating a policy group attribute value with a user involves using the user context attribute values described in Lei. User context attribute values are associated with a user session, and are established when the user session is established. A session is a specific connection of a user to a database server via a user process. Upon establishing a session, DBMS 100 stores information, typically in memory, that pertains to the session. The information maintained includes the user context attribute values stored in association with a session of user 210.

According to an embodiment of the present invention, DBMS 100 provides mechanisms for defining context attributes, which may have multi-part names. The multi-part names have the form namespace.attribute name.

For example, for the multi-part name 'Company_B.policygroup', "Company_B" is the namespace, and "policygroup" is the attribute name. A database administrator may issue data definition language ("DDL") commands to DBMS 100 specifying namespace and attribute names that are associated with the name space. In response to receiving such commands, DBMS 100 generates metadata defining the namespace and the attribute name.

Some of the context attribute values of a session may be set by a user in an unrestricted manner. Others of the context attribute values of the session may be set by the user with certain restrictions. DBMS 100 provides a mechanism for a database administrator to define what functions may be called to access particular context attribute values. These functions may embed logic that implements rules which govern access to the particular context attribute values, rules that govern when and how the particular context attribute may be set or read. For example, an access rule of particular context attribute value allows users associated with company A to change policy group attribute 132. A database administrator issues DDL commands that specify what function to call to set a particular context attribute. The function includes logic that restricts users associated with company A to setting the policy group attribute 132 to a particular set of values, each corresponding to a particular policy group. When an application transmits a message to DBMS 100 to change the context attribute to a new value, DBMS 100 invokes the function to change the attribute. The function checks context value attributes that identify the user, to determine whether the user is associated with company A, and whether the new value belongs to the particular set of values.

For security purposes, it is desirable to prevent users from changing some context attribute values, such as one that identifies a user. The context attribute values that a user is not allowed to set are referred to herein as primitive context attribute values. Primitive context values may include, for example, the user id, the session id and the actual system time. The responsibility of enforcing the restriction falls on an attribute setting mechanism controlled by DBMS 100, such as User context setting attribute mechanism 120.

DBMS 100 may be configured to define for a particular table the particular user context attribute that serves as a policy group attribute. In particular, database system may be configured to receive commands from, for example, a database administrator that designates a particular user context attribute as a policy group attribute for a database schema object.

By providing the ability to define a user context attribute and what user context attribute specifies a policy group for a particular database schema object, the database administrator may create and designate a particular context attribute that is used to identify policy groups for a set of schema objects. Because the database administrator may specify functions used by users to set the context attribute, the database administrator may implement a set of functions that are used to control who may set the context attribute value and how they may be set. In this way, a mechanism may be provided that securely enables applications to specify what and when policy groups control access to database schema objects.

For example, a database administrator may create a context attribute "ApplCtx.Active_Policy Group", and designate "AplCtx.Active_Policy" as the policy group attribute for a set of tables. The database administrator may then define a function that is used to set the "AplCtx.Active_Policy". The function restricts an application from setting AplCtx.Active_Policy on behalf of a user to values that correspond to policy groups that have been established for the user. For example, database application 108 would only be allowed to set on behalf of user 110 the AplCtx.Active_Policy to the value "CompanyAHR", while database application 116 would only be allowed to set on behalf of user 114 the AplCtx.Active_Policy to the value "CompanyBHR".

While an embodiment of the present invention has been illustrated using user context attribute values to identify policy groups, the present invention is not limited to use of user context attribute values. As mentioned earlier, any context information may be used, preferably, context information that may be trusted and therefore relied upon by a database management system for security purposes.

Partitioning Access Control By Policy Groups

Figure 2:
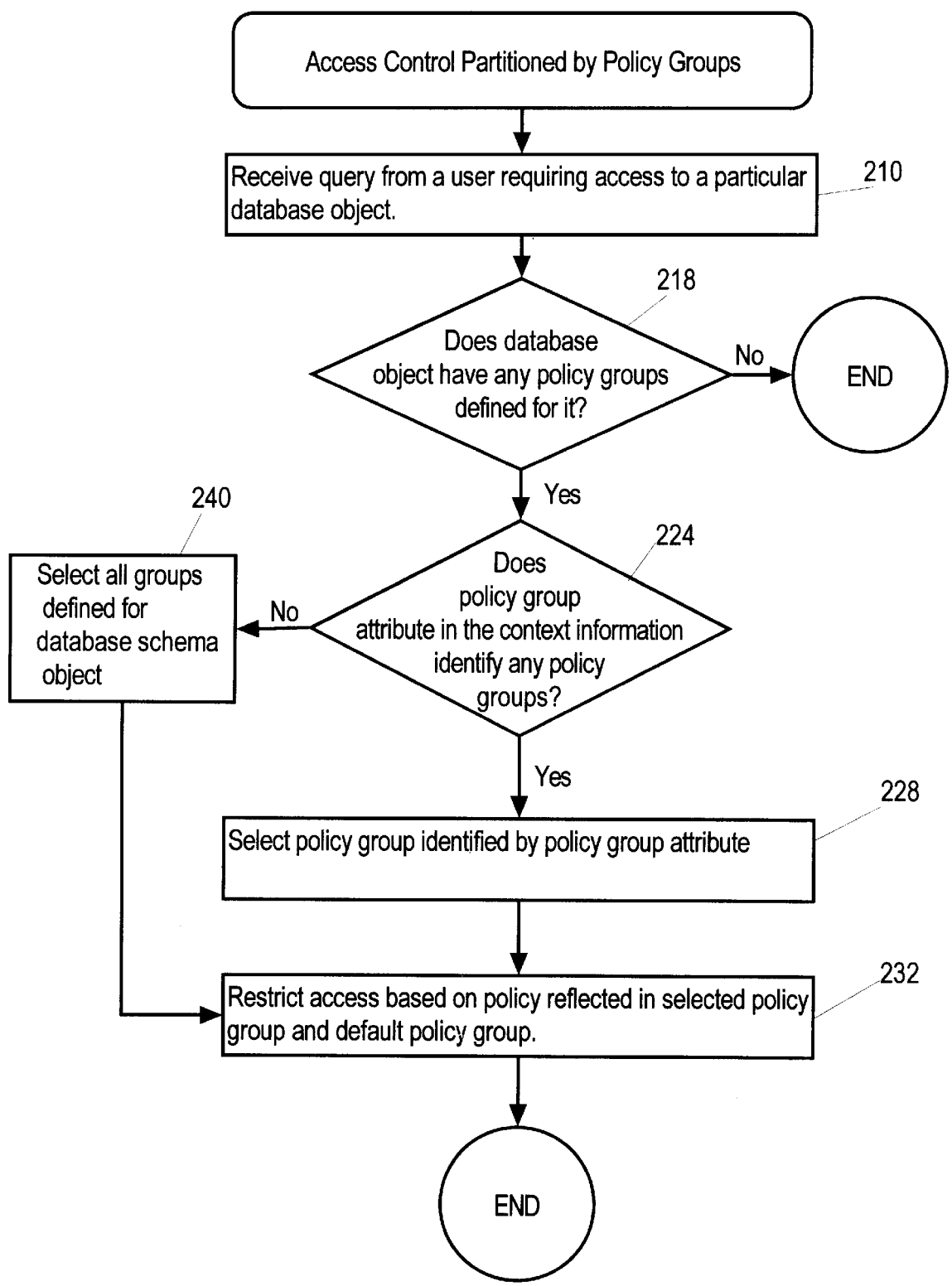
FIG. 2 is a flow chart depicting a process for access control according to an embodiment of the present invention.

FIG. 2 is a flow chart depicting a process for partitioned access control. The process is illustrated using DBMS 100. The process is initiated when DBMS 100 receives a request to execute a query.

Referring to FIG. 2, at step 210, DBMS 100 receives a query from a user requiring access to a particular database schema object. In this example DBMS 100 receives a query issued by database application 108 on behalf of user 110 that requests retrieval of particular fields in database schema object 104.

At step 218, DBMS 100 determines whether database schema object 104 has any policy groups defined for it. DBMS 100 makes this determination by inspecting database metadata, which defines for database schema object 104 three policy groups—default policy group 150, company A HR policy group 160, and company B HR policy group 170.

At step 224, DBMS 100 determines whether the policy group attribute 132 specifies a policy group. If DBMS 100 determines that policy group attribute 132 specifies a policy group, then control flows to step 228. At step 228, DBMS 100 selects the identified policy group. In this example DBMS 100 selects company A HR policy group 160.

At step 232, DBMS 100 restricts access based on the policies reflected in the selected policy group and the default policy group 150. In this example, DBMS 100 restricts access according to policies reflected in company A HR policy group 160 and default policy group 170. DBMS 100 invokes each of policies 152, 154, 162, and 164, which return query predicates which are, at least logically, appended to the query.

If at step 224, on the other hand, DBMS 100 determines that policy group attribute 132 does not specify a policy group, control flows to step 240, where all policy groups defined for the database schema object 104 are selected. Without this measure, it is possible that a user or application could avoid having policies applied by simply not setting the policy group attribute so that none would be selected.

Selecting all policy groups in this case ensures that all access rules reflected in all the policies will be applied.

Hardware Overview

Figure 3:
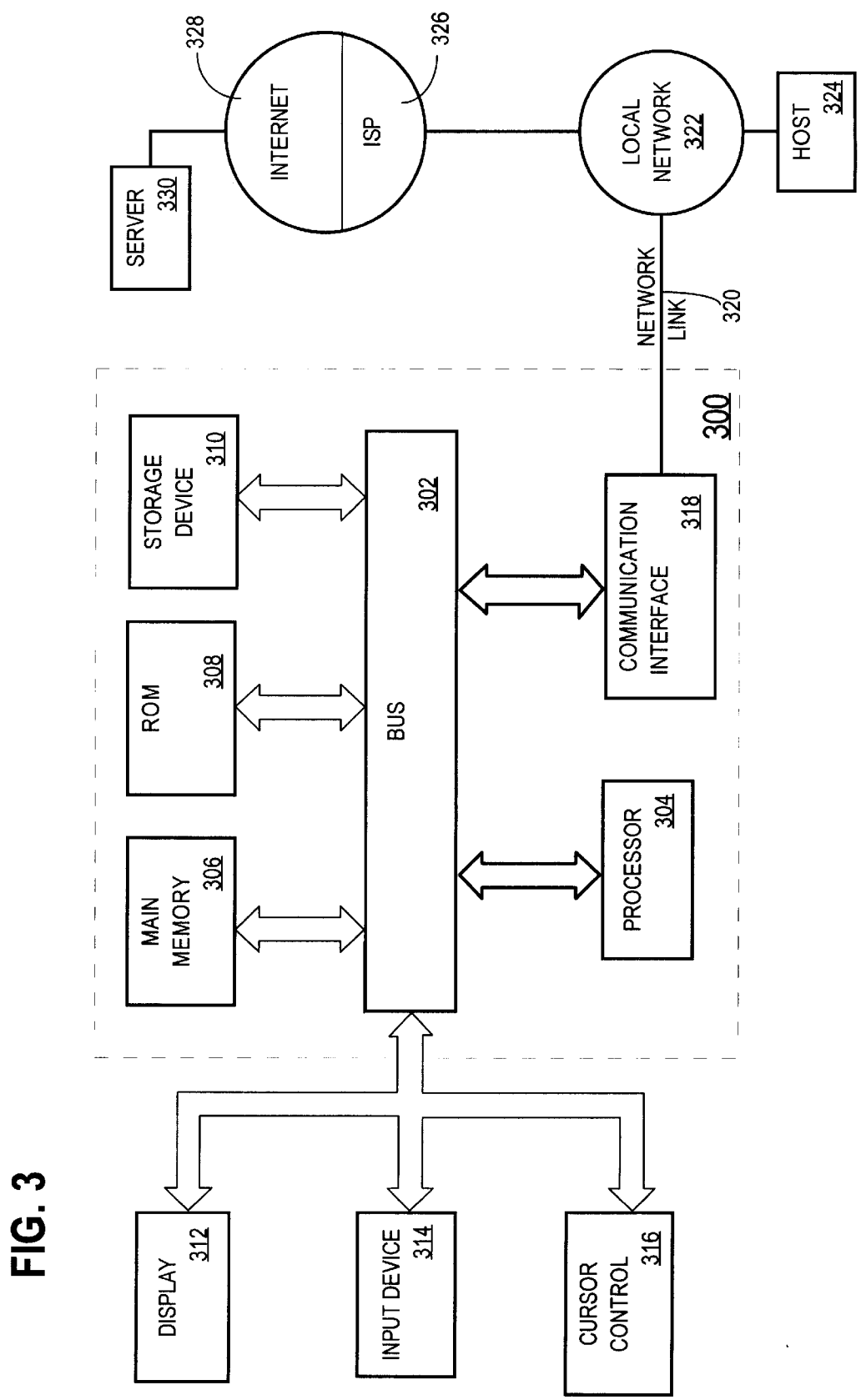
FIG. 3 is a block diagram depicting a computer system upon which an embodiment of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for partitioned access controls. According to one embodiment of the invention, partitioned access control is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for partitioned access control as described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling access to data in a database system, the method comprising the steps of:
   establishing a plurality of security policy groups for a database schema object in said database system, wherein each security policy group of said plurality of security policy groups includes at least one policy, wherein said at least one policy is a rule that governs access to said database schema object;
   selecting a first set of one or more security policy groups of said plurality of security policy groups for a first user based on first context information associated with said first user;
   selecting a second set of one or more security policy groups of said plurality of security policy groups for a second user based on second context information associated with said second user;
   wherein said second set of one or more security policy groups contains a security policy group that is not a member of said first set of one or more security policy groups;
   receiving a query associated with said first user that requires data that resides in said database schema object, wherein said query does not specify any security policy group in said first set of one or more security policy groups and said second set of one or more policy groups;
   restricting access of said query to said database schema object based on policies reflected in said first set of selected one or more security policy groups; and
   restricting access of said second user to said database schema object based on policies reflected in said second set of selected one or more security policy groups.

2. The method of claim 1, wherein:
   the step of establishing a plurality of security policy groups includes establishing a default security policy group; and
   wherein the step of restricting access of said query includes restricting access of said query to said database schema object based on policies reflected in both said selected one or more security policy groups and said default security policy group.

3. The method of claim 1, wherein:
   said first context information contains an attribute used to identify a particular security policy group; and
   the step of selecting a first set of one or more security policy groups includes selecting one or more security policy groups based on said attribute.

4. The method of claim 3, wherein the step of selecting a first set of one or more security policy groups based on said attribute includes:
   determining whether said attribute identifies any particular security policy group; and
   if said attribute does not identify any particular security policy group, then selecting all of said plurality of security policy groups.

5. The method of claim 2, further including the step of setting said attribute using an attribute mechanism that selectively restricts access to attributes of said first context information.

6. The method of claim 5, wherein said attribute mechanism sets said attribute in response to messages from a client of the database system.

7. The method of claim 3, wherein:
   the method further includes the step of generating metadata specifying that said attribute indicates said particular security policy for said database schema object; and
   the step of selecting a first set of one or more security policy groups includes:
      inspecting said metadata to determine that said attribute indicates a particular security policy for said database schema object, and
      in response to determining that said attribute indicates a particular security policy for said database schema object, selecting one or more security policy groups based on said attribute.

8. The method of claim 1, wherein the step of restricting access of said query includes said database system rewriting said query to append one or more predicates to a query, said one or more predicates reflecting said policies.

9. The method of claim 1, wherein the step of establishing a plurality of security policy groups includes establishing a set of one or more policy functions that belong to said security policy groups.

10. The method of claim 9, wherein the step of restricting access of said query includes appending one or more predicates to a query, said one or more predicates reflecting said policies, wherein said one or more predicates are generated by one or more policy functions belonging to said selected one or more security policy groups.

11. The method of claim 1, further including the steps of:
    selecting another one or more security policy groups of said plurality of security policy groups for another user based on context information associated with said other user;
    restricting access of said other user to said database schema object based on policies reflected in said selected other one or more security policy groups; and
    wherein said other one or more security policy groups and said first set of one or more security policy groups selected for said first user are not identical.

12. A computer-readable medium carrying one or more sequences of instructions for controlling access to data in a database system, wherein execution of the one or more sequences of instructions by one or more processors causes the one or more processors to perform the steps of:
    establishing a plurality of security policy groups for a database schema object in said database system, wherein each security policy group of said plurality of security policy groups includes at least one policy, wherein said at least one policy is a rule that governs access to said database schema object;
    selecting a first set of one or more security policy groups of said plurality of security policy groups for a first user based on first context information associated with said first user;
    selecting a second set of one or more security policy groups of said plurality of security policy groups for a second user based on second context information associated with said second user;
    wherein said second set of one or more security policy groups contains a security policy group that is not a member of said first set of one or more security policy groups;
    receiving a query associated with said first user that requires data that resides in said database schema object, wherein said query does not specify any security policy group in said first set of one or more security policy groups and said second set of one or more policy groups;

restricting access of said query to said database schema object based on policies reflected in said first set of selected one or more security policy groups; and restricting access of said second user to said database schema object based on policies reflected in said second set of selected one or more security policy groups.

13. The computer-readable medium of claim 12, wherein:

the step of establishing a plurality of security policy groups includes establishing a default security policy group; and wherein the step of restricting access of said query includes restricting access of said query to said database schema object based on policies reflected in both said selected one or more security policy groups and said default security policy group.

14. The computer-readable medium of claim 12, wherein:

said first context information contains an attribute used to identify a particular security policy group; and the step of selecting a first set of one or more security policy groups includes selecting one or more security policy groups based on said attribute.

15. The computer-readable medium of claim 14, wherein the step of selecting a first set of one or more security policy groups based on said attribute includes:

determining whether said attribute identifies any particular security policy group; and if said attribute does not identify any particular security policy group, then selecting all of said plurality of security policy groups.

16. The computer-readable medium of claim 13, further including one or more sequences of instructions for performing the step of setting said attribute using an attribute mechanism that selectively restricts access to attributes of said first context information.

17. The computer-readable medium of claim 16, wherein said attribute mechanism sets said attribute in response to messages from a client of the database system.

18. The computer-readable medium of claim 14, wherein:

the computer-readable medium further includes one or more sequences of instructions for performing the step of generating metadata specifying that said attribute indicates said particular security policy for said database schema object; and the step of selecting one or more security policy groups includes:

inspecting said metadata to determine that said attribute indicates a particular security policy for said database schema object, and in response to determining that said attribute indicates a particular security policy for said database schema object, selecting one or more security policy groups based on said attribute.

19. The computer-readable medium of claim 12, wherein the step of restricting access of said query includes said database system rewriting said query to append one or more predicates to a query, said one or more predicates reflecting said policies.

20. The computer-readable medium of claim 12, wherein the step of establishing a plurality of security policy groups includes establishing a set of one or more policy functions that belong to said security policy groups.

21. The computer-readable medium of claim 20, wherein the step of restricting access of said query includes appending one or more predicates to a query, said one or more predicates reflecting said policies, wherein said one or more predicates are generated by one or more policy functions belonging to said selected one or more security policy groups.

22. The computer-readable medium of claim 12, further including one or more sequences of instructions for performing the steps of:

selecting another one or more security policy groups of said plurality of security policy groups for another user based on context information associated with said other user;

restricting access of said other user to said database schema object based on policies reflected in said selected other one or more security policy groups; and wherein said other one or more security policy groups and said first set of one or more security policy groups selected for said first user are not identical.

* * * * *

UNITED STATES PATENT AND TRADEMARK OFFICE
CERTIFICATE OF CORRECTION

PATENT NO.    : 6,578,037 B1
DATED         : June 10, 2003
INVENTOR(S)   : Wong et al.

It is certified that error appears in the above-identified patent and that said Letters Patent is hereby corrected as shown below:

Column 14,
Line 4, replace "selecting one" with -- selecting a first set of one --.

Signed and Sealed this

Twenty-third Day of September, 2003

JAMES E. ROGAN
*Director of the United States Patent and Trademark Office*